Patented Jan. 17, 1933

1,894,924

UNITED STATES PATENT OFFICE

JOSEF VARGA, OF BUDAPEST, HUNGARY, ASSIGNOR TO DEUTSCHE GOLD- UND SILBER-SCHEIDEANSTALT VORMALS ROESSLER, OF FRANKFORT-ON-THE-MAIN, GERMANY, A CORPORATION OF GERMANY

HYDROGENATION OF NAPHTHALENE

No Drawing. Application filed October 3, 1929, Serial No. 397,167, and in Germany October 13, 1928.

It is known that benzol and hydrocarbons of the benzene series such as toluol, xylol and the like, can be obtained by the action of hydrogen on naphthalene at high temperatures in the presence of catalysts.

In British Patent 253,507 of Kling and Florentin a process is described for example in which the treatment is carried out at temperatures between 350° and 460° C. at increased pressure with the use of halogenides, particularly chlorides of alkali earth metals, earth metals of the aluminium or iron group. When employing catalytic mixtures of iron chloride and aluminium chloride according to the statements of this patent by the action of hydrogen for two and a half hours on the naphthalene, 60 per cent of the naphthalene employed was converted into a light oil, the main portion of which distilled off between 100 and 200° C. In the absence of catalysts or by employing other catalysts than the halogenides mentioned above, only about 30 per cent of the naphthalene was converted into a liquid product, according to the statements of the British patent, and which in this case is the main consisted of tetrahydronaphthalene.

According to Swiss Patent 123,330 and Swiss patent of addition 127,689, naphthalene is treated at temperatures of 200 to 500° C. in the presence of catalysts at a desired pressure with water vapour or hydrogen or gaseous mixtures containing hydrogen. In this case dehydrogenating elements were recommended as catalysts, for example, nickel, cobalt and iron, and again dehydrogenating oxides, for example, oxides of molybdenum, vanadium, tungsten, manganese and chromium, in certain cases in conjunction with activators such as, for example, oxides of zinc, cadmium, uranium, thorium, zirconium and beryllium. In so far as the catalysts employed did not already contain oxides of chromium, molybdenum, tungsten and vanadium, these oxides could be added to the catalysts in small quantities to serve as activators. Contact poisons, particularly sulphur, are to be avoided as much as possible before the hydrogenating of the naphthalene, according to the statements in the patent.

In addition to unchanged naphthalene liquid hydrocarbons were obtained as products of the reaction and consisted mainly of benzol, toluol and xylol and moreover saturated gaseous hydrocarbons.

According to British specification No. 283,600, cyclic compounds, including among others naphthalene, are hydrated at temperatures above 300° with a reduced pressure, normal pressure or slightly raised pressure, with the help of hydrogen in the presence of mixed catalysts. Especially for producing benzene and its next homologues, the following are suitable as mixed catalysts:—Iron, cobalt, nickel, molybdenum, vanadium, tungsten, manganese, or chromium, or compounds of such or mixtures of the said metals or their compounds. Further, copper, silver, gold, zinc, cadmium, uranium, niobium, platinum, and the like may be used. Here also the removal of contact poisons as, for example, sulphur, before the hydrogenation is recommended.

It has now been found that among the large number of catalysts previously recommended for effecting the hydrogenation of naphthalene, compounds of molybdenum and of tungsten, as, for example, molybdic acid, tungstic acid, molybdates, tungstates, and so forth, occupy a special position in so far that they, in combination with certain other catalysts, present the possibility of effecting the treatment of naphthalene to produce benzol or hydrocarbons of the benzene series with very special advantage. The term molybdenum catalysts hereinafter used will be understood to mean molybdenum compounds such as molybdic acid, molybdates, molybdenum or substances containing molybdenum compounds or molybdenum.

It has been found that as additional catalysts, hydrogen sulphide or compounds or materials which are capable, under the given operating conditions, of yielding hydrogen sulphide, as, for example, sulphur, are suitable as the additional catalysts. By the cooperation of hydrogen sulphide with molybdenum compounds or tungsten compounds, or with the metals molybdenum and tungsten, with the use of high pressures and suitably selected high temperatures, the naphthalene used is converted extremely quickly with the production of very high yields of benzol and benzene hydrocarbons, and, in fact, with the direct production of products which show a high degree of purity, and consequently, no longer need a subsequent treatment, such as a refining treatment, but are capable of use without further treatment.

It has, in fact, already been incidentally proposed to carry out hydrogenation in the presence of catalysts which contain combined sulphur, as, for example, iron sulphide, molybdenum sulphide, and the like; in some cases in such a way that the sulphides in question, by the interaction of metals or metal oxides on the one hand, and sulphur or suitable sulphur compounds on the other hand, are produced at the beginning of the hydrogenation process. Further, it has also been occasionally proposed to use gaseous mixtures containing hydrogen for carrying out the hydrogenation processes, and which contain admixtures of, for example, carbon monoxide, hydrogen sulphide, methane, water vapour or the like.

From such proposals, however, it could not be deduced in any event that hydrogen sulphide in combination with certain particular other catalysts, namely molybdenum or tungsten compounds, could present a catalytic combination the action of which considerably exceeds in various directions the results obtainable with molybdenum and tungsten compounds alone. This new experience is all the more surprising since hitherto in the hydrogenation of naphthalene, sulphur and sulphur compounds have been regarded precisely as contact poisons which according to known proposals ought to be removed as far as possible before commencing the hydrogenation process.

For producing this catalytic combination effect, it is not sufficient that the hydrogen sulphide is substantially present or in desired amounts; rather the amounts of hydrogen sulphide must be so determined that the catalytic action of the remaining catalysts (molybdenum or tungsten compounds), is improved. In general, for the production of the combination effect, 1 to 10 parts, and preferably 2 to 5 parts, of hydrogen sulphide to 100 parts of naphthalene are necessary. The most suitable proportion for any particular case can be easily ascertained by previous experiment.

Moreover, it is important, in order to obtain the results of the present invention, to use the correct amounts of hydrogen, the correct high pressure, and in particular the correct temperature. The hydrogen is preferably employed in considerable excess, for example, so that it amounts to several times the amount consumed in the reaction. While in the known process first mentioned above insofar as it mentions catalysts containing molybdenum and tungsten compounds, it is stated that, as regards the pressure, it is possible to work at any desired pressure or at normal pressure or at reduced or slightly increased pressures, but the present invention requires high pressures, preferably pressures above 100 atmospheres, for example, pressures between 100 to 500 atmospheres.

If naphthalene is subjected to heating under pressure with excess of hydrogen in the presence of the combination of catalysts set forth, upon reaching a certain temperature a sudden fall in temperature takes place, which corresponds to an absorption of heat by the naphthalene of at least 3,000 to 4,000 calories per gram molecule. Immediately following this, a considerable rise in temperature occurs, for example, such a rise as 100° and more. The point of sudden fall in temperature in general lies within relatively narrow limits, for example, between 460 and 500°, which are again dependent upon the working conditions. When working with tungstic acid as a catalyst in the presence of suitable amounts of hydrogen sulphide at a partial pressure of hydrogen of about 250 atmospheres, the critical temperature point, for example, occurs at about 480°. This critical temperature point may be conveniently referred to as the sudden fall temperature.

According to the invention, now the procedure is that after heating the reaction mixture to the point of sudden fall in temperature, further heating is so carried out that the reaction material is kept at temperatures which are above the said critical temperature.

In general, it has proved advantageous to work so that the process is carried out at temperatures which lie at least 20° above the critical point. If the critical temperature occurs, for example, at 480°, then when working with temperatures of, for example, 500 to 510°, a product is obtained which contains, besides benzol, a considerable amount of homologues such as toluol and xylol.

A rise in temperature above this point operates, on the one hand, to accelerate the formation of benzol, and on the other hand, in the reverse direction. Upon working with temperatures of 540° and more, a reaction product is obtained which mainly consists only of benzene. The highest permissible temperature limits may in any case be easily ascertained by preliminary experiments. Too long heating is to be avoided, since this gives rise to further splitting up of the benzol hydrocarbons.

Higher partial pressures of hydrogen, for example, 95 to 97 per cent of the total pressure, favours the formation of benzene. The lower hydrogen partial pressures, for example, 75 to 80 per cent of the total pressure, favours the formation of homologues, such as toluol and xylol.

The primary hydrogenation products of naphthalene, such as tetra- and decahydro-naphthalene, may be employed as starting materials in certain cases in such a way that substances arising from earlier processes are returned into the process in order to convert it, together with the freshly used naphthalene, into benzene hydrocarbons.

The process may be carried out discontinuously or continuously with a flowing stream of gas. In the latter case, care has to be taken that the ratios of the amounts of naphthalene, hydrogen and hydrogen sulphide present during the reaction, as well as the speed of flow of the mixture of gas and vapour, remain constant during the reaction so that the content of hydrogen sulphide during the process is maintained within the limits favourable for the reaction.

A special advantage of the process consists in the fact that the direct treatment of crude naphthalene containing sulphur can be effected so that the purification of this starting material hitherto usual can be omitted. The sulphur content of the crude naphthalene must be taken into account in such a way that the optimum amount necessary for the combination effect of the hydrogen sulphide and the catalyst is retained.

*Example*

Naphthalene is heated for 60 minutes at 540° with the addition of 4 per cent of sulphur and 2 per cent of molybdic acid in hydrogen under an initial pressure of 120 atmospheres. The partial pressure of hydrogen is kept between 95 to 97 per cent of the total pressure. A product of specific gravity 0.878 is obtained. Upon distilling the product, 97 per cent goes over at temperatures up to 100°. The reaction product accordingly consists almost entirely of benzene.

I claim

1. A method of producing benzol and hydrocarbons of the benzene series comprising heating naphthalene with an excess of hydrogen in the presence of molybdenum catalysts and a sufficient quantity of hydrogen sulphide to increase the action of the molybdenum catalysts, until a sudden fall in temperature occurs, heating the naphthalene and hydrogen above said sudden fall temperature while simultaneously admitting naphthalene and hydrogen to continuously produce benzol and hydrocarbons of the benzene series.

2. A method of producing benzol and hydrocarbons of the benzene series which comprises heating naphthalene with an excess of hydrogen at an increased pressure in the presence of molybdenum catalysts and a sufficient quantity of hydrogen sulphide to increase the action of the molybdenum catalysts until a sudden fall in temperature occurs, and then heating the naphthalene and hydrogen above said sudden fall temperature.

3. A method of producing benzol and hydrocarbons of the benzene series which comprises heating naphthalene with an excess of hydrogen in the presence of molybdenum catalysts and a sufficient quantity of hydrogen sulphide to increase the action of the molybdenum catalysts, at an increased pressure, until a sudden fall in temperature occurs, and then heating the naphthalene and hydrogen above said sudden fall temperature while simultaneously admitting naphthalene and hydrogen to continuously produce benzol and hydrocarbons of the benzene series.

4. A method of producing benzol and hydrocarbons of the benzene series which comprises heating naphthalene with an excess of hydrogen in the presence of molybdenum catalysts and a sufficient quantity of hydrogen sulphide to increase the action of the molybdenum catalysts, at an increased pressure, until a sudden fall in temperature occurs, and then heating the naphthalene and hydrogen at a temperature which is more than 20° C. above the sudden fall temperature, while simultaneously admitting naphthalene and hydrogen to continuously produce benzol and hydrocarbons of the benzene series.

5. A method as claimed in claim 4 in which the temperature at which the naphthalene and hydrogen is heated is more than 50° C. above the sudden fall temperature.

6. A method as claimed in claim 4 in which the pressure exceeds 100 atmospheres.

7. A method as claimed in claim 4 in which the pressure exceeds 100 atmospheres and the temperature at which the naphthalene and hydrogen is heated is more than 50° C. above the sudden fall temperature.

8. A process as claimed in claim 3 wherein there are from 2 to 10 parts of hydrogen sulphide present for each 100 parts of naphthalene.

9. A process as claimed in claim 3 wherein the partial pressure of the hydrogen is at least 75% of the total pressure.

10. A process as claimed in claim 3 wherein the operating hydrogen partial pressure exceeds 95% of the total pressure.

11. A method as claimed in claim 3 comprising heating naphthalene with an excess of hydrogen at a pressure above 100 atmospheres in the presence of molybdenum catalysts until a sudden fall in temperature occurs, and then heating the naphthalene and hydrogen at a temperature which is more than 50° C. above the sudden fall temperature, the hydrogen partial pressure exceeding 95% of the total pressure, while simultaneously admitting naphthalene and hydrogen to continuously produce benzol and hydrocarbons of the benzene series.

12. A method as claimed in claim 3 which comprises heating the naphthalene and hydrogen at a temperature which is at least 480° C.

13. A process as claimed in claim 3 in which the naphthalene and hydrogen is heated at a temperature which is at least 540° C.

JOSEF VARGA.